(No Model.)

C. NERACHER, Dec'd.
O. J. Frey, Administrator.
VALVE FOR FIRE EXTINGUISHING SYSTEMS.

No. 533,825. Patented Feb. 5, 1895.

Attest
Wm. T. Hall.
Walter Donaldson

Inventor
Charles Neracher
by Ellis Spear
Atty

UNITED STATES PATENT OFFICE.

CHARLES NERACHER, OF CLEVELAND, OHIO; OTTO J. FREY ADMINISTRATOR OF SAID CHARLES NERACHER, DECEASED.

VALVE FOR FIRE-EXTINGUISHING SYSTEMS.

SPECIFICATION forming part of Letters Patent No. 533,825, dated February 5, 1895.

Application filed April 6, 1894. Serial No. 506,558. (No model.)

*To all whom it may concern:*

Be it known that I, CHARLES NERACHER, a citizen of the United States of America, residing at Cleveland, in the county of Cuyahoga and State of Ohio, have invented certain new and useful Improvements in Valves for Fire-Extinguishing Systems, of which the following is a specification.

It is the object of my invention to provide a drain valve for dry pipe fire extinguishing systems designed to prevent leakage water from passing the valve and accumulating in the system above the valve thus pressing upon and weighing the same down to such an extent as to impede the quick operation of the valve and destroy its sensitiveness.

It is my object to so arrange the drain that the leakage water will be caught and taken off before passing the valve, the drain for this purpose running to the valve seat, and this will permit a small amount of water to be retained in the valve chamber about the valve sufficient only to prevent the corrosion of the parts, the valve when normally seated closing the drain and retaining this small body of water.

Figure 1:
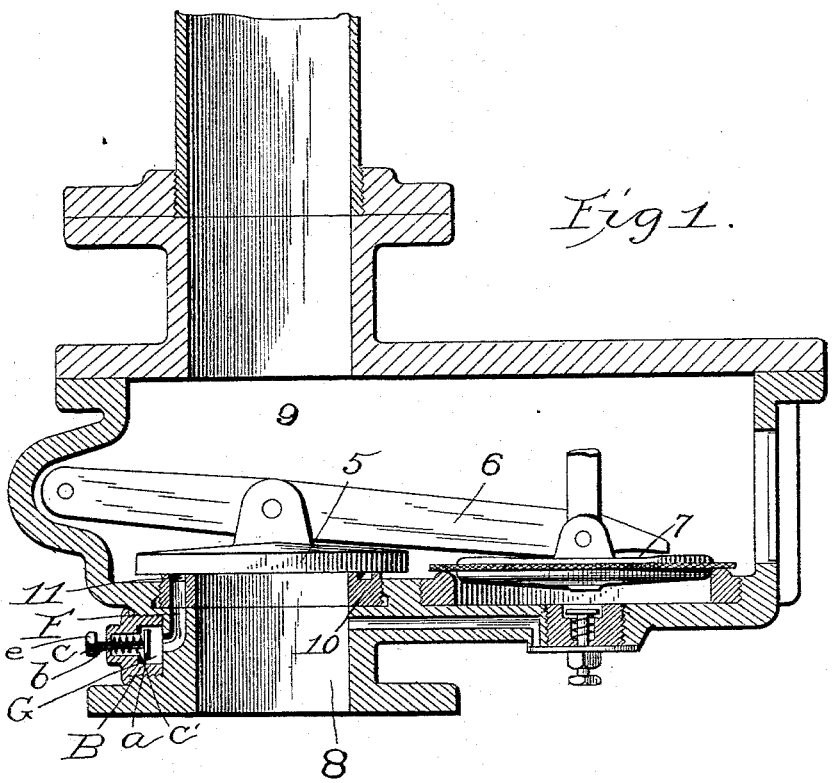
Figure 2:
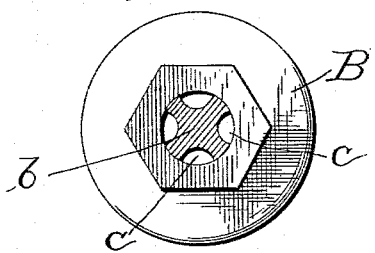

In the accompanying drawings I show in Figure 1 a valve casing in section combined with the drain valve. Fig. 2, is a detail view of the grooved valve stem.

The valve mechanism includes the disk 5 carried by the pivoted lever 6 and the pressure head 7 on the end of said lever, this mechanism being substantially the same as that forming the subject matter of my application now pending, Serial No. 501,246, dated February 23, 1894. This mechanism however, may be of any approved form with the valve 5 closing the inlet 8 to the dry pipe system 9.

The valve seat ring 10 is screw threaded into the casing and is grooved on its upper face at 11 said groove extending annularly about the opening. This groove connects with the drain conduit F leading down to the valve chamber G formed by the box B which is screw threaded into the casing. Said box carries a disk valve $a$ on a valve stem $b$ which being grooved longitudinally at $c$ provides an outlet for the leakage water from the annular groove of the valve seat ring. The drain valve is normally pressed from its seat $d$ by the spring $c'$, the inward movement of the valve being limited by the nut or head $e$ on the valve stem, and the valve being thus normally open a free outlet is provided for any leakage water passing under the valve and into the annular groove, and all the leakage will be caught by this groove. The nut on the valve stem is also grooved or channeled and the leakage from the drain chamber thus passes to the outside along the grooved stem and the channeled nut. When the valve is properly seated and held the drain will be covered and closed and the drain will not be brought into use excepting upon the leakage of the valve. Under normal conditions this will permit a small body of water being maintained in the valve chamber to cover the mechanism and prevent rusting of the parts. When the valve mechanism is released and the full water pressure is on the pressure through the drain will close the drain valve and thus prevent any escape of the water and thus avoid reduction of the pressure in the system.

I claim—

In combination, the main valve with its seat and the fitting for holding said parts, the conduit extending down from said seat and through the fitting, the box B screwed into the fitting over the said conduit, the valve in said box having a stem projecting outside the same, the spring for forcing the valve normally inward to drain the conduit and the nut on the outer end of the stem to limit the inward movement of the valve, said valve stem being grooved longitudinally and through the nut, substantially as described.

In testimony whereof I affix my signature in presence of two witnesses.

CHARLES NERACHER.

Witnesses:
M. MILLARD,
ANDREW DREXLER.